April 7, 1970   C. R. POTTER ET AL   3,504,493
HYDRAULIC UNIT AND CONTROL LINKAGE WITH OVERLOAD CONTROL
Filed Aug. 16, 1968

INVENTORS
Carl R. Potter,
John R. Clements, &
James J. Mooney, Jr.

A. M. Heiter
ATTORNEY 3,504,493
Patented Apr. 7, 1970

3,504,493
HYDRAULIC UNIT AND CONTROL LINKAGE WITH OVERLOAD CONTROL
Carl R. Potter, Indianapolis, John A. Clements, Danville, and James J. Mooney, Jr., Indianapolis, Ind., assignors to General Motors Corporation, Detroit, Mich., a corporation of Delaware
Filed Aug. 16, 1968, Ser. No. 753,295
Int. Cl. F15b *15/18;* B62d *11/04;* F04d *15/00*
U.S. Cl. 60—52                 7 Claims

ABSTRACT OF THE DISCLOSURE

Disclosed herein is a hydraulic unit having a control linkage operative to control the displacement of the hydraulic unit which is preferably comprised of two servocontrolled hydraulic pumps and two hydraulic motors which cooperate to form a variable ratio hydrostatic drive and steer transmission. The control linkage includes an operator control, which is movable fore and aft, and a plurality of links and levers which transmit movement of the operator control to the servocontrol. Movement of the operator controls in the same direction produces equal displacement change in the pumps while movement of the control in opposite directions provides opposite displacement changes. Interposed among and operatively connected to the links and levers is a rotatable carrier assembly which provides pivot points for the control linkage which are adjustable or movable in response to an input power signal to modify or modulate the operator movements so that a given amount of operator movement provides more or less servocontrol movement depending on the position of the pivot points to control the power use in accordance with available power. Also, movement of the carrier, in response to power demand during a steer maneuver, causes the pumps to decrease in displacement without affecting the rate of steer.

---

This invention relates to linkage controls and more particularly to linkage controls in which the input movement is modified in response to an external control parameter to produce a variable output movement.

A positive displacement hydraulic unit when used as a power converting and transmitting device, between the power source and the load to be driven, requires the use of a control which wil automatically vary the power absorbing characteristics of the hydraulic unit. If such a control is not used, the power required to drive the load may exceed the power output capabilities of the power source and cause the power source to stall or otherwise fail during operation. The use of a hydrodynamic unit such as a torque converter prevents engine stall due to the slip characteristic of the hydrodynamic unit. A positive displacement hydraulic unit, however, has no slip characteristic except as provided by a relief valve which limits the pressure output of the hydraulic unit. When a relief valve is employed, the hydraulic unit must be designed so that the input power to the hydraulic unit as determined by the displacement of the unit and the system pressure established by the relief valve, does not exceed the power output of the power source. This approach seriously limits the displacement of the hydraulic unit or the working pressure which, in turn, limits the working range of the hydraulic system. It is well known that to provide an efficient hydraulic system which will operate over a wide range of speeds and pressures, a variable displacement hydraulic unit is used. When a variable displacement unit is used, it becomes necessary to provide a control which will limit the displacement of the unit in response to the power output level of the power source. Thus, a relief valve will not provide an efficient control since it limits only system pressure. When an overload control is used, with a hydrostatic transmission, having two pumps and two motors, that provides steering by maintaining a differential displacement between the two pumps, the rate of steer must be maintained during an overload. The present invention does provide a control which will limit the displacement of the unit and maintain a constant steer rate during overload.

In the present invention, the operator establishes the maximum displacement at which the hydraulic unit may operate through a linkage system. The linkage system includes an overload control which modifies the movement, imposed on the linkage system by the operator, in response to the power level of the power source. The overload control includes movable or adjustable pivot points in the linkage system, between the operator and the hydraulic unit servo control, which respond to the input power. Thus, the operator movement is transferred, substantially unchanged, over the full range to the servo control when no power overload is present while the operator movement is only partially transferred or not transferred at all when a power overload would be present at full hydraulic unit displacement or at some displacement less than full.

It is, therefore, an object of this invention to provide in a linkage control for a hydraulic unit, adjustable pivot points on a rotatable member in the linkage between the operator control and the hydraulic unit control which rotatable member and pivot points are operated on by a power overload signal to modify the operator control movement to thereby limit the movement of the hydraulic unit control.

It is another object of this invention to provide in a linkage control system a carrier member rotated by an expansible fluid motor in response to an overload signal so that slidable members on the carrier member provide adjustable pivot points in the linkage control to modify the relative movement between an input link and an output link depending upon the position of the pivot points.

It is another object of this invention to provide an overload control, including a rotatable carrier, for a drive and steering hydrostatic transmission that will maintain the steer rate established by the operator when an overload occurs during steering.

These and other objects of the invention will become more apparent from the following description of the invention illustrated in the accompanying drawings in which.

Figure 1:
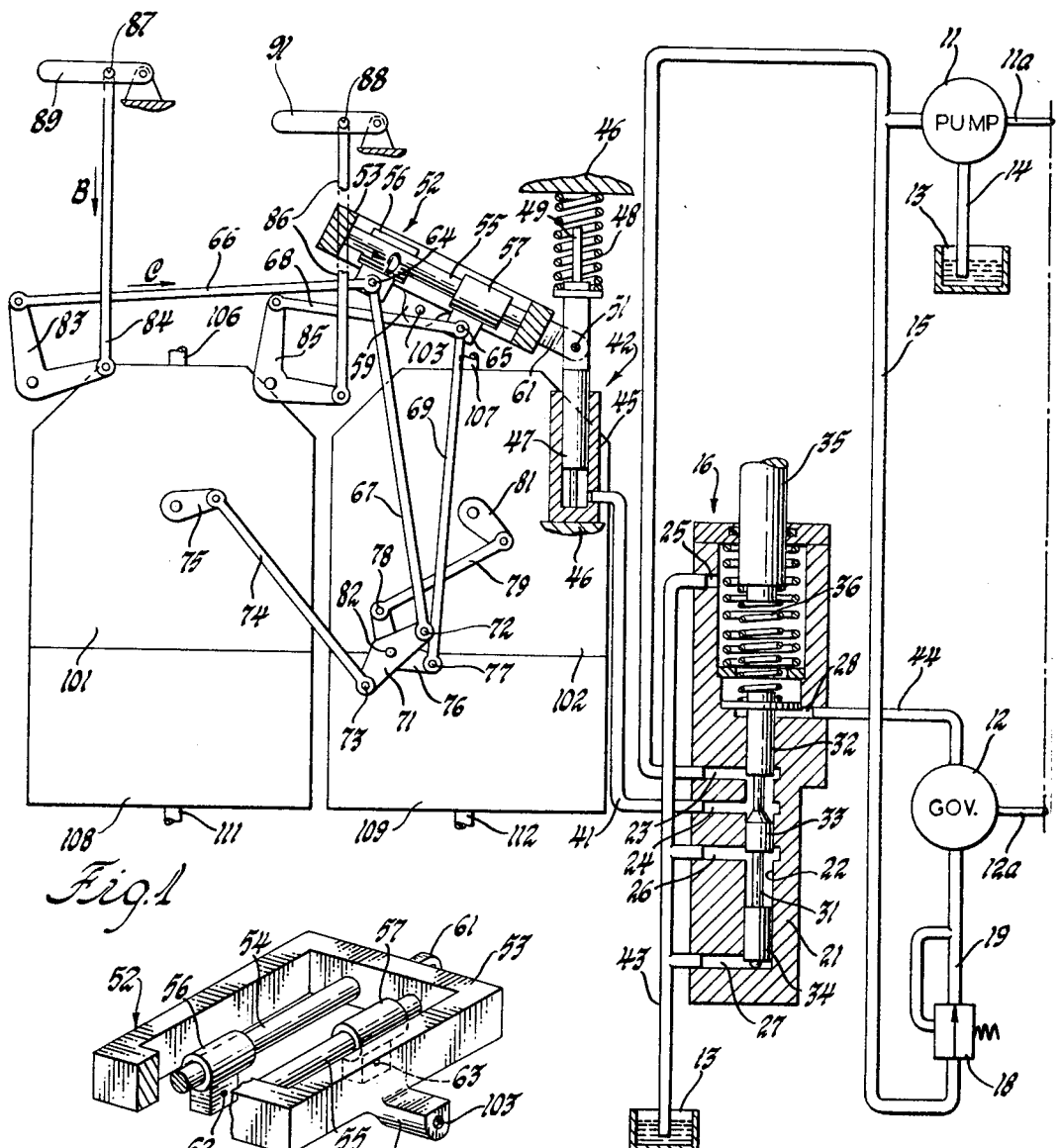
FIGURE 1 is a plan view partly in section showing the control linkage.
Figure 2:
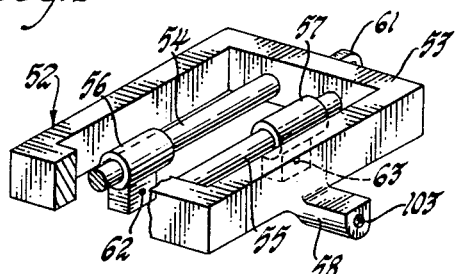
FIGURE 2 is a perspective view showing the carrier member and slide members of the control system.

Referring now to the drawings, wherein like reference characters represent like or corresponding parts throughthe several views, there is shown in FIGURE 1 a pump 11 and a governor 12 both adapted to be driven by an engine through input shafts 11a and 12a. The pump 11 draws fluid from a sump 13 via passage 14 and delivers fluid, under pressure, via passage 15 to a control valve 16, and a reducing valve 18 which, in turn, delivers fluid via passage 19 to the governor 12. The control valve 16 has a valve body 21 having a bore 22 and fluid ports 23, 24, 25, 26, 27 and 28, a valve spool 31, slidably disposed in the bore 22, having a plurality of lands 32, 33 and 34, a throttle link 35, and a spring 36 held in compression between the spool 31 and the throttle link 35. The inlet port 23 is connected to receive fluid via passage 15 from pump 11 while the outlet port 24 is connected to deliver fluid via a passage 41 to an expansible fluid motor 42. The ports 25, 26 and 27 are exhaust ports which are connected via passage 43 to the sump 13. Port 28 is connected with the governor 12 via passage 44. The control valve 16 receives signals from the prime mover throttle control and governor which are converted to forces acting on the valve spool 31 to cause the valve spool 31 to open the inlet port 23 to the outlet port 24 if a power overload is present. The control valve 16 is disclosed in U.S. patent application Ser. No. 709,007.

The expansible fluid motor 42 has a cylinder portion 45 secured to a stationary frame 46, a piston 47 slidably mounted in the cylinder portion 45 and a spring member 48 which is held in compression between the upper end of piston 47 and the frame 46. Integral with the upper end of piston 47, is a stop member 49 which limits the upper movement of the piston 47 when fluid pressure in passage 41 acts on the lower end of piston 47. A pin 51 is secured to the piston 47, intermediate the cylinder portion 45 in the upper end of the piston 47, which operatively connects the piston 47 to a carrier assembly 52.

The carrier assembly 52 includes rectangular frame member 53 which supports two rod members 54 and 55 on which are slidably mounted pivot members 56 and 57 respectively. The frame member has two pintle members 58 and 59 extending outward therefrom to rotatably support the carrier assembly 52 in a stationary frame member. An extension member 61, secured to the rectangular carrier 53 is operatively connected to the end 51 to provide a pivotal connection between the carrier assembly 52 and the piston 47.

Two slide members 56 and 57 have openings 62 and 63 respectively in which pin members 64 and 65 are secured. The pin member 64 provides the pivotal connection between links 66 and 67 while the pin 65 provides a pivotal connection between links 68 and 69. The link 67 is pivotally connected to a transfer lever 71 at pivot point 72. Another pivot point 73 on the transfer lever 71 provides an operative connection between an output link 74 which is operatively connected between a pump servo 75 and the transfer lever 71. The link 69 is operatively connected to a transfer lever 76 at a pivot point 77, while another pivot point 78 provides an operative connection between the transfer lever 76 and an output link 79 which is operatively connected to a pump servo 81. Both of the transfer levers 71 and 77 are pivotally mounted on a pin 82. The servo members 75 and 81 may be of the rotary type such as that disclosed in the U.S. patent application Ser. No. 715,213.

The link 66 is operatively connected to a pivotally mounted bell crank 83 which, in turn, is pivotally connected to an input link 84. The link 68 is operatively connected to a pivotally mounted bell crank 85 which, in turn, is pivotally connected to an input link 86. The input links 84 and 86 are operatively connected at 87 and 88 to operator controls 89 and 91.

Movement of the input link 84 by operator control 87 in the direction of arrow B causes the bell crank 83 to rotate clockwise thereby causing the links 66 to move in the direction of arrow C and the pivot point 64 to move along the slide member 54 in the direction of arrow D. This causes a generally downward movement of link 67 which induces clockwise rotataion in the transfer lever 71 and through output link 74, counterclockwise rotation of the servo 75. Rotation of the servo 75 causes a change of displacement in the pump 101 which it controls. Movement of the input link 86 results in a rotation of servo 81 which controls the displacement of pump 102 in a manner similar to that described above for input link 84. Two hydraulic motors 108 and 109 are in fluid communication with the pumps 101 and 102 respectively. Each of the motors 108 and 109 has an output shaft 111 and 112 which are adapted to provide a drive to the wheels of a vehicle. Thus the pumps 101 and 102 and the motors 108 and 109 constitute a hydraulic unit which provides hydrostatic drive between the engine and the wheels. Equal movement of operator controls 87 and 91 produces a drive ratio change in the hydraulic unit. Unequal or opposite movement of operator controls 87 and 91 produces a steer bias in the hydraulic unit, such that one motor rotates faster than or in the opposite direction from the other motor.

The pumps 101 and 102 are drivingly connected by input shafts 106 and 107 to the engine which has a throttle control operatively connected to the throttle link 35 of the control valve 16. Thus the input power requirement of the pumps 101 and 102 is sensed by the control valve 16 which in the event of an engine overload, directs the hydraulic signal via passage 41 to the expansible fluid motor 42. When an overload signal is present at the expansible motor 42, the piston 47 moves upward thereby causing the carrier assembly 52 to rotate counterclockwise on its pintle members 58 and 59. Rotation of the carrier assembly 52 does not cause any linear movement of the link 66 or 68. It does, however, cause a generally downward movement of link 67 and an upward movement of the link 69 when they are in the position shown. The movement of links 67 and 69, as described above, causes the servos 75 and 81 to rotate thereby effecting a reduction in the displacement of their respective pumps to reduce the input power requirement and prevent an engine overload. When the overload signal is removed from the expansible motor 42, the carrier assembly 52 will return to the position shown and increase the displacement of the pumps 101 and 102 accordingly.

The pumps 101 and 102 are preferably of the overcenter type; that is, they will provide reversible flow depending upon the direction which the servo control is moved from the neutral or zero displacement position. As viewed in FIGURE 1, one of the pumps 101 or 102 has a positive displacement while the other has a negative displacement. The direction of fluid flow from the pumps 101 and 102; that is, positive or negative flow, is determined by the direction in which the slide members 56 and 57 and the pivot points 64 and 65, associated therewith are displaced from the center of the pintles 58 and 59. For example, if both pivot points move upward from the central point 103, positive flow occurs from both pumps while as the pivot points 64 and 65 move downward or to the right from central point 103, negative flow is produced in both pumps. When the pivot points 64 and 65 are axially aligned with the central point 103, both pumps are in the neutral or zero displacement position. If the carrier assembly 52 is placed in the horizontal position, by the expansible motor 42, movement of the pivot point 64 and 65 results in no substantial change in pump displacement. As the carrier member 52 is rotated out of the horizontal plane toward the position shown, a given amount of displacement of the pivot points 64 and 65 along the slide members 54 and 55 results in an increasing amount of pump displacement change. This is due to the fact that the upward or downward movement of link 67 or 69 increases as the angle of carrier assembly 52, relative to horizontal, increases. Should an overload occur during a steer maneuver, both pumps 101 and 102 will be moved toward zero displacement. However, the rate of steer, established by the operator, will remain unchanged.

Many modifications may be made of the above described illustrative embodiment without departing from the spirit and scope of the invention.

What is claimed is:

1. A fluid pressure system including power input means; fluid pressure means, drivingly connected to said power input means, including servo controlled variable displacement fluid pumping means and servo means operable to control the displacement of said pumping means; operator control means including link-lever means having a plurality of pivot points and being operatively connected to said servo means for controlling the operation of said servo means; and overload control means including a rotatable carrier member, slide means slidably mounted on said carrier member for providing movable pivot points for said link-lever means, and motor means operatively connected to said carrier member to provide rotation thereof, whereby rotation of said carrier member into one plane will permit maximum displacement change of said pumping means in response to operation of said link-lever means and rotation of said carrier into another plane will permit minimum displacement change of said pumping means.

2. A control linkage including movable input link means; output link means movable in response to movement of said input link means; angularly adjustable carrier means operatively connected between said input and output link means including a rotatably mounted frame member, a plurality of rods secured to said frame member and slide means slidably mounted on said rods for providing an operative connection between said input and output link means; and motor means for providing angular adjustment of said carrier means in a plurality of planes whereby adjustment of said carrier means in a first plane provides minimum movement range of said output link means in response to movement of said input link means; adjustment of said carrier means in a second plane provides maximum movement range of said output link means in response to movement of said input link means, and adjustment of said carrier means in a plane intermediate said first and second planes provides movement of said output link means in response to movement of said input link means greater than the minimum movement range and less than the maximum movement range.

3. A fluid pressure system including a pair of variable displacement fluid transfer units each having an input shaft adapted to be driven by a power source; control means having two modes of operation for simultaneously varying the displacement of each of said fluid transfer units in equal amounts and direction in one mode and equal amounts and opposite direction in the other mode, including input control means for providing an operator demand signal, output control means for providing a displacement change demand signal proportional to the operator demand signal, and proportion adjusting means operatively connected between said input and output control means for controlling the proportion between the operator demand signal and the displacement change demand signal including planar means adjustable in a plurality of planes for providing maximum proportion between the demand signals in one plane and minimum proportion between the demand signals in another plane and a plurality of proportions between the demand signals in a plurality of planes between the maximum and minimum planes; and power demand means operatively connected to said planar means and adapted to be operatively connected to the power source to control the planar locations of said planar means.

4. In combination a hydrostatic transmission including power input means drivingly connected to a pair of variable displacement hydraulic pumps having displacement controls, a pair of hydraulic motors, each operatively connected to one of said hydraulic pumps to be driven thereby; power signal means operatively connected to said input power means for providing an input power signal; operator control means including link-lever means having a plurality of pivot points and being operatively connected to said displacement controls for controlling the displacement of said hydraulic pumps; and overload control means including a rotatable carrier member, slide means slidably mounted on said carrier member for providing movable pivot points for said link-lever means, and motor means operatively connected to said carrier member and said power signal means and being responsive to said input power signal to provide rotation of the carrier member, whereby rotation of said carrier member into one plane will permit maximum displacement change of said pumps in response to operation of said link-lever means and rotation of said carrier into another plane will permit minimum displacement change of said pumps.

5. In combination a hydrostatic transmission including input power means; a pair of variable displacement hydraulic pump means each having displacement control means, and an input shaft drivingly connected to said input power means, pair of hydraulic motor means each operatively connected to one of said pump means to be driven thereby; power signal means operatively connectable to said input power means for providing an input power signal; control means for simultaneously varying the displacement of each of said pump means in equal amounts and direction to provide drive ratio change in said hydrostatic transmission and unequal amounts to provide steer bias in said hydrostatic transmission, including input control means for providing an operator demand signal, output control means for providing a displacement change demand signal proportional to the operator demand signal, and proportional adjusting means operatively connected between said input and output control means for controlling the proportion between the operator demand signal and the displacement change demand signal including planar means adjustable in a plurality of planes for providing maximum proportion between the demand signals in one plane and minimum proportion between the demand signals in a plurality of planes between the maximum and minimum planes; and power demand means operatively connected to said planar means and operatively connected to said power signal means and responsive to said input power signal to control the planar locations of said planar means.

6. A control linkage including operator control means to provide an input control movement comprising operator control means; a pair of input links operatively connected to said operator control means being movable thereby; a pair of pivotally mounted bell cranks each operatively connected to one of said input links being rotatable in response to movement of said input links; a pair of first transfer links each pivotally connected to one of said bell cranks being movable in response to rotary movement of said bell cranks; rotatable carrier means including a carrier member pivotally mounted for rotation into a plurality of planes, a pair of rod members secured to said carrier member, and a pair of slide members each slidably mounted on one of said rod members and having pivot points pivotally connected to one of said first transfer links and slidable on said rod members in response to movement of said first transfer links; a pair of second transfer links each pivotally mounted on one of said slide members at the pivot points movable in response to sliding of said slide members, said second transfer links having maximum movement when said carrier member is in one plane and minimum movement when said carrier member is in another plane; a pair of pivotally mounted levers each operatively connected to one of said second transfer links rotatable in response to movement of said second transfer links; a pair of output links each operatively connected to one of said levers movable in response to rotation thereof; a pair of servo control means to provide an output control movement each operatively connected to one of said output links movable in response to movement thereof; and motor control means operatively connected to said rotatable carrier means to control the planar location of said carrier member, whereby equal movement of said operator control means produces proportional equal undirectional movement of said servo control means and unequal movement of said operator control means produces proportional unequal movement of said servo control means, the amount of proportional movement of said servo control means being determined by the planar location of said carrier member.

7. In combination a hydrostatic transmission including a pair of variable displacement hydrostatic pumps, a pair of displacement control means for controlling the displacement of said hydrostatic pumps, and a pair of hydrostatic motors each in fluid communication with one of said hydrostatic pumps; and a control linkage including operator control means to provide an input control movement comprising a pair of operator levers, a pair of input links operatively connected to said operator levers being movable thereby, a pair of pivotally mounted bell cranks each operatively connected to one said input links being rotatable in response to movement of said input links, a pair of first transfer links each pivotally connected to one of said bell cranks being movable in response to rotary movement of said bell cranks, rotatable carrier means including a carrier member pivotally mounted for rotation into a plurality of planes including a plane parallel to said first transfer links, a pair of rod members secured to said carrier member, and a pair of slide members each slidably mounted to one of said rod members having pivot points pivotally connected to one of said first transfer links and slidable on said rod members in response to movement of said first transfer links; a pair of second transfer links each pivotally mounted on one of said slide members at the pivot points movable in response to sliding of said slide members, said second transfer links having maximum movement when said carrier member is in one plane oblique to said first transfer links and minimum movement when said carrier member is in another plane parallel to said first transfer links, a pair of pivotally mounted levers each operatively connected to one of said second transfer links rotatable in response to movement of said second transfer links; a pair of output links each operatively connected between one of said levers and one of said displacement control means and being movable in response to rotation of said levers, and motor control means operatively connected to said rotatable carrier means to control the planar location of said carrier member, whereby equal movement of said operator levers produces proportional equal unidirectional movement of said displacement control means and equal unidirectional displacement change in said pumps and unequal movement of said operator levers produces proportional unequal move- of said displacement control means and unequal displacement change in said pumps, the amount of proportional movement of said displacement control means and displacement change of said pumps being determined by the planar location of said carrier member.

References Cited

UNITED STATES PATENTS

| | | | |
|---|---|---|---|
| 2,446,242 | 8/1948 | Orshansky | 180—6.48 |
| 3,024,858 | 3/1962 | Davis et al. | 180—6.48 |
| 3,065,700 | 11/1962 | Blenkle. | |
| 3,161,245 | 12/1964 | Thoma | 60—53 XR |
| 3,224,196 | 12/1965 | Bennett. | |

EDGAR W. GEOGHEGAN, Primary Examiner

U.S. Cl. X.R.

60—53; 103—11; 180—6.48

UNITED STATES PATENT OFFICE
CERTIFICATE OF CORRECTION

Patent No. 3,504,493                      April 7, 1970

Carl R. Potter et al.

It is certified that error appears in the above identified patent and that said Letters Patent are hereby corrected as shown below:

Column 2, line 56, "through" should read -- throughout --. Column 3, line 61, "rotataion" should read -- rotation --. Column 5, lines 34 and 35, cancel "means having two modes of operation for simultaneously shaft adapted to be driven by a power source; control"; line 42, "proportion" should read -- proportional --. Column 7, line 7, after "one" insert -- of --.

Signed and sealed this 29th day of September 1970.

(SEAL)
Attest:

Edward M. Fletcher, Jr.                      WILLIAM E. SCHUYLER, JR.
Attesting Officer                                Commissioner of Patents